United States Patent [19]
Mirkin

[11] Patent Number: 5,100,265
[45] Date of Patent: Mar. 31, 1992

[54] ROTATABLE CHANGEOVER PARTS FOR CONVEYOR SYSTEM

[75] Inventor: Vadim Mirkin, Newark, Calif.

[73] Assignee: Jetstream Systems, Inc., Hayward, Calif.

[21] Appl. No.: 645,025

[22] Filed: Jan. 22, 1991

[51] Int. Cl.⁵ .................................... B65G 51/02
[52] U.S. Cl. ...................... 406/86; 406/79; 406/82
[58] Field of Search ............. 406/86, 87, 88, 52, 406/79, 109, 82

[56] References Cited

U.S. PATENT DOCUMENTS

| | | |
|---|---|---|
| 3,131,974 | 5/1964 | Futer . |
| 3,180,688 | 5/1963 | Futer . |
| 3,394,463 | 7/1968 | Futer . |
| 3,435,536 | 4/1969 | Tinley . |
| 3,761,134 | 9/1973 | Hurd . |
| 3,953,076 | 4/1976 | Hurd . |
| 4,146,467 | 5/1979 | Sauer . |
| 4,284,370 | 8/1981 | Danler et al. . |
| 4,822,214 | 4/1989 | Aidlin et al. ........................ 406/86 |
| 4,938,636 | 7/1990 | Aidlin et al. ................. 406/183 X |
| 4,944,635 | 7/1990 | Carlier . |
| 5,028,174 | 7/1991 | Karass ................................ 406/88 |

FOREIGN PATENT DOCUMENTS

| | | | |
|---|---|---|---|
| 2580609 | 10/1986 | France | 406/86 |
| 9010587 | 9/1990 | World Int. Prop. O. | 406/88 |

Primary Examiner—Margaret A. Focarino
Assistant Examiner—James M. Kannofsky
Attorney, Agent, or Firm—Townsend and Townsend

[57] ABSTRACT

A rotatable structure is provided which has a plurality of sets of guide rails. Each set of guide rails can be brought into alignment with objects on a first conveyor system. Each set of guide rails has a different shape or slope so that, by rotating the structure to select a desired set of guide rails, the height or level of objects can be easily selected to match the adjacent conveyor systems.

19 Claims, 5 Drawing Sheets

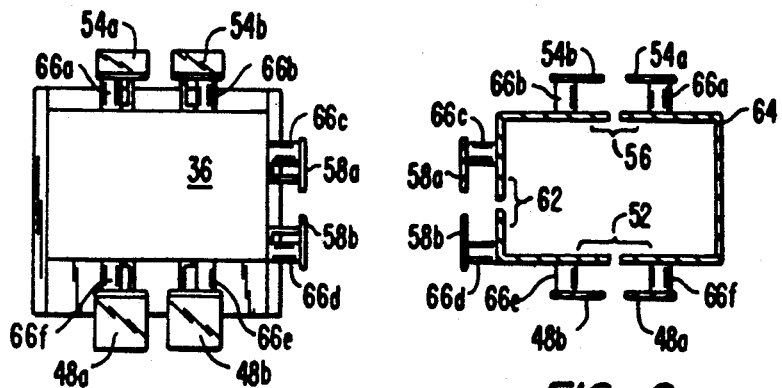
FIG. 4.
FIG. 6.
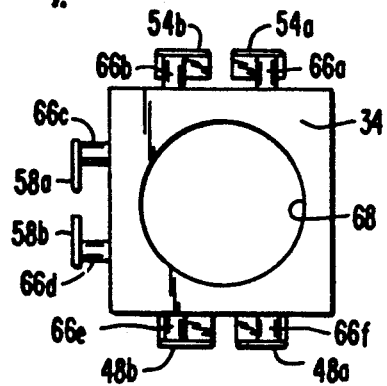
FIG. 5.
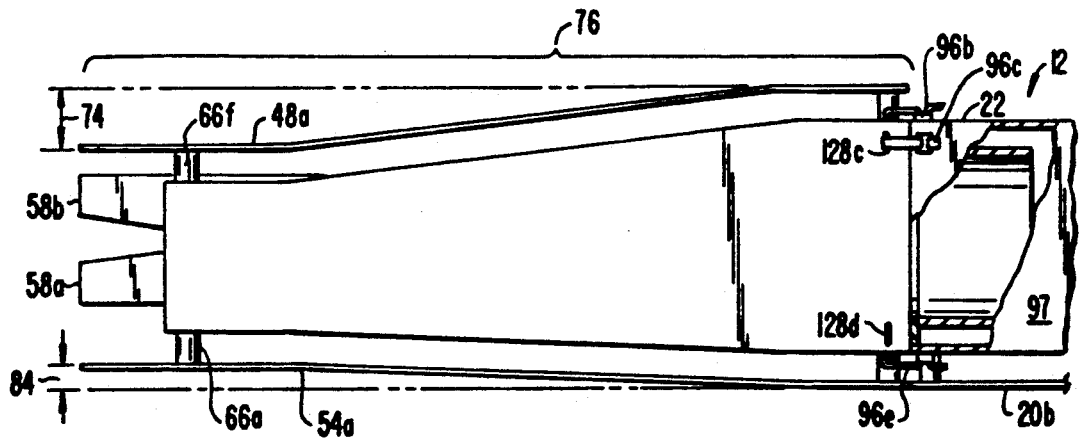
FIG. 7.

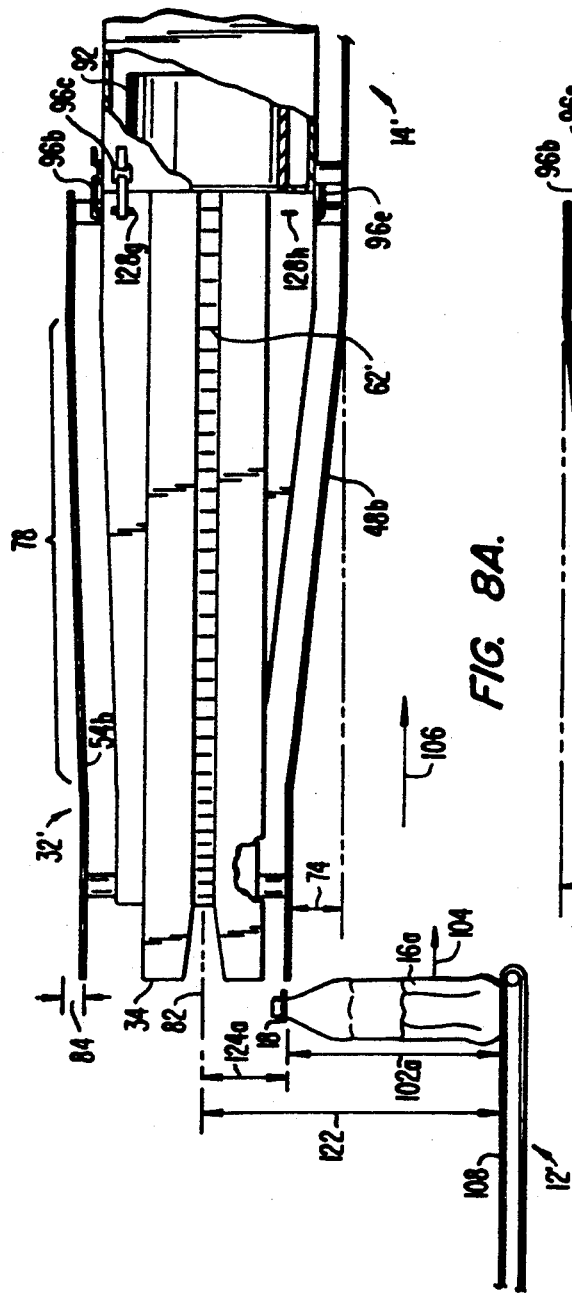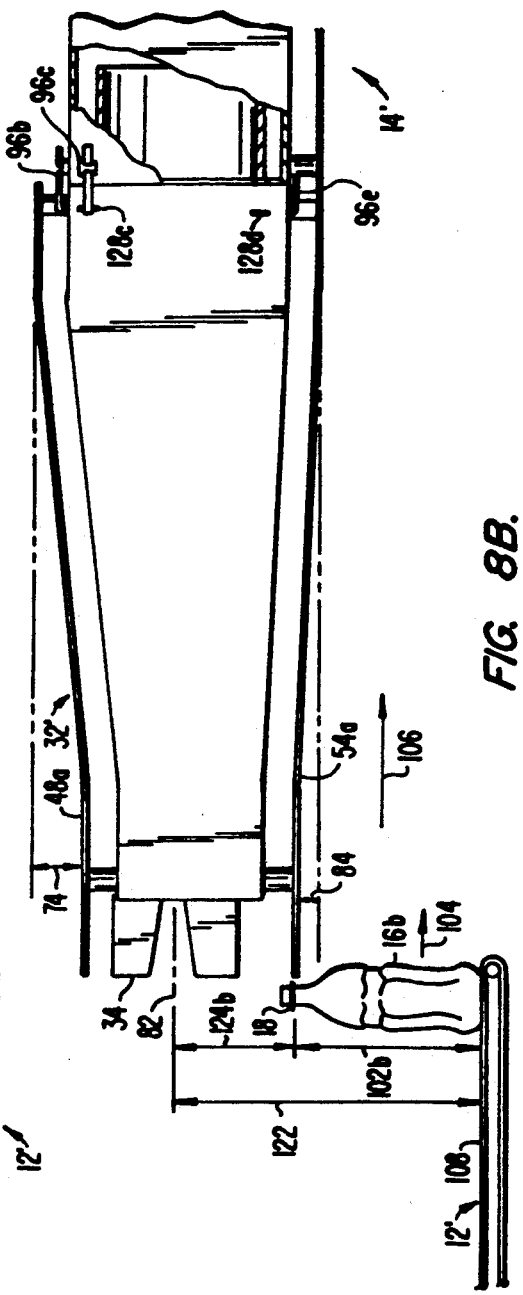
FIG. 8A.
FIG. 8B.

ROTATABLE CHANGEOVER PARTS FOR CONVEYOR SYSTEM

BACKGROUND OF THE INVENTION

The present invention relates to changeover parts for a conveyor such as an air conveyor which changes the height at which objects are conveyed and in particular to changeover parts which are rotatable to accommodate a plurality of heights of conveyed objects.

Conveyor systems, such as pressurized air conveyor systems, belt conveyors and the like, are sometimes called upon for conveyance of objects which have a plurality of sizes. For example, a conveyor system might be used in one period of time for conveyance of a larger sized object, and during another period of time, conveyance of a smaller sized object. A changeover part is a part which is used in connection with conveying objects from one portion of a conveyor system to another portion of a conveyor system. Certain types of changeover parts produce a positioning of the conveyed objects which is different depending on the size of the object conveyed.

FIGS. 1A and 1B illustrate this situation. FIG. 1A depicts, in cross-section, a first conveyor system 12 and a second conveyor system 14. In this case, the first conveyor system 12 is a pressurized air conveyor system for conveying ring-necked bottles 16a. The neck of the ring-necked bottles 16a include a ring 18 supported by guide rails 20a, 20b. Movement of the bottles 16a is achieved by directing pressurized air from a conduit or plenum 22 through apertures of an apertured wall 24 of the plenum 22 to direct streams of pressurized air against the bottles 16a. Secondary guide rails 26a, 26b can also be provided. A description of a pressurized air conveyor can be found in U.S. Pat. No. 4,284,370, issued Aug. 31, 1981, to Danler, et al. The second conveyor system 14 depicted in FIG. 1A is a belt conveyor system. To transfer objects 16a from the first conveyor system 12 to the second conveyor system 14, it is necessary to have a changeover part, which, as the objects 16a are conveyed, will change the level of conveyance so as to align the bottom of the object 16a with the belt 14. Thus, the changeover part will have guide rails which are ramped downward an amount equal to the distance 28a between the bottom of the object 16a and the belt of the second conveyor 14.

FIG. 1B depicts the situation when a smaller object 16b is conveyed by the first conveyor system 12. Because of the smaller size of the object 16b, a changeover part with a different configuration is needed. In the situation in FIG. 1B, a changeover part must be more highly sloped in order to move the object 16b vertically a distance 28b so as to align the bottom of the object 16b with the belt of the second conveyor system 14.

Previous conveyor systems typically approached this problem by providing changeover parts which were difficult to insert into the system. Typically, a set of changeover guide rails which might be used in the configuration shown on FIG. 1A would be removed such as by removing bolts or other holding devices, a second set of guide rails would be positioned in place of the removed first set of guide rails and the second set of guide rails would then be attached such as by bolting or the like. This procedure of removing and installing changeover parts was labor-intensive and time-consuming, and required the shutdown of the conveyor line for a relatively long period of time. This system also imposed the burden of maintaining and storing an inventory of changeover parts.

Another changeover system used a set of guide rails which could be positioned in a variety of heights or slopes using a type of parallelogram-linkage. Although this system for moving the guide rails permits adjustment to any intermediate position within a range, it is complicated and expensive. The movable guide rail system includes a large number of moving parts which require a large space for installation and are subject to wear and thus decrease reliability of the device. Further this system failed to provide positive drive over the entire length of conveyance, instead providing pressurized air drive only over portions of the path of conveyance. Provision of positive drive for the entire length of the path is particularly important in feed regions where, unlike a typical discharge region, there is little or no accumulation of objects. Thus the objects are typically fed one at a time and receive no conveyance assist from succeeding accumulated objects.

Accordingly, it would be useful to provide a changeover part which can accommodate a plurality of sizes of conveyed objects which is fast and easy to reconfigure, which reduces the number of moving parts used in previous devices and which reduces wear on components, particularly the guide rail system.

SUMMARY OF THE INVENTION

According to the present invention, a plurality of changeover parts are rotatably mounted with respect to the first conveyor system so that by rotating the changeover parts, a first set of changeover parts is moved away from the guide rails of the first conveyor system and a second set of changeover parts is brought into alignment to permit engagement with objects being conveyed on the first conveyor system. Preferably, the changeover parts are mounted on and rotate with a conduit or plenum which is mounted on one end of one of the conveyor systems to permit rotation about an axis. Preferably, the axis is substantially parallel to the direction of objects conveyed by the first conveyor near its downstream end. In one embodiment, the changeover part is a type of air conveyor and the driving air is supplied from one of the first and second conveyors via a circular opening in its end which also serves as a bearing support for the changeover part while it is rotating. One or more latches are preferably used to hold a desired changeover part in the desired spatial relationship to the first and second conveyors.

BRIEF DESCRIPTION OF THE DRAWINGS

FIG. 4 is an end elevational view of the structure of FIG. 3 from the downstream end;

FIG. 5 is an end elevational view of the structure of FIG. 3 from the upstream end;

FIG. 6 is a cross-sectional view taken along line 6—6 of FIG. 3;

FIG. 7 is a side elevational view of the apparatus of FIG. 3, but showing the rotatable structure rotated to a second position;

FIG. 8A is a side elevational view of apparatus according to another embodiment of the present invention with the rotatable structure in a first position;

FIG. 8B is a side elevational view of the apparatus of FIG. 8A, but showing the rotatable structure rotated to a second position.

DETAILED DESCRIPTION OF THE PREFERRED EMBODIMENT

Figure 2:
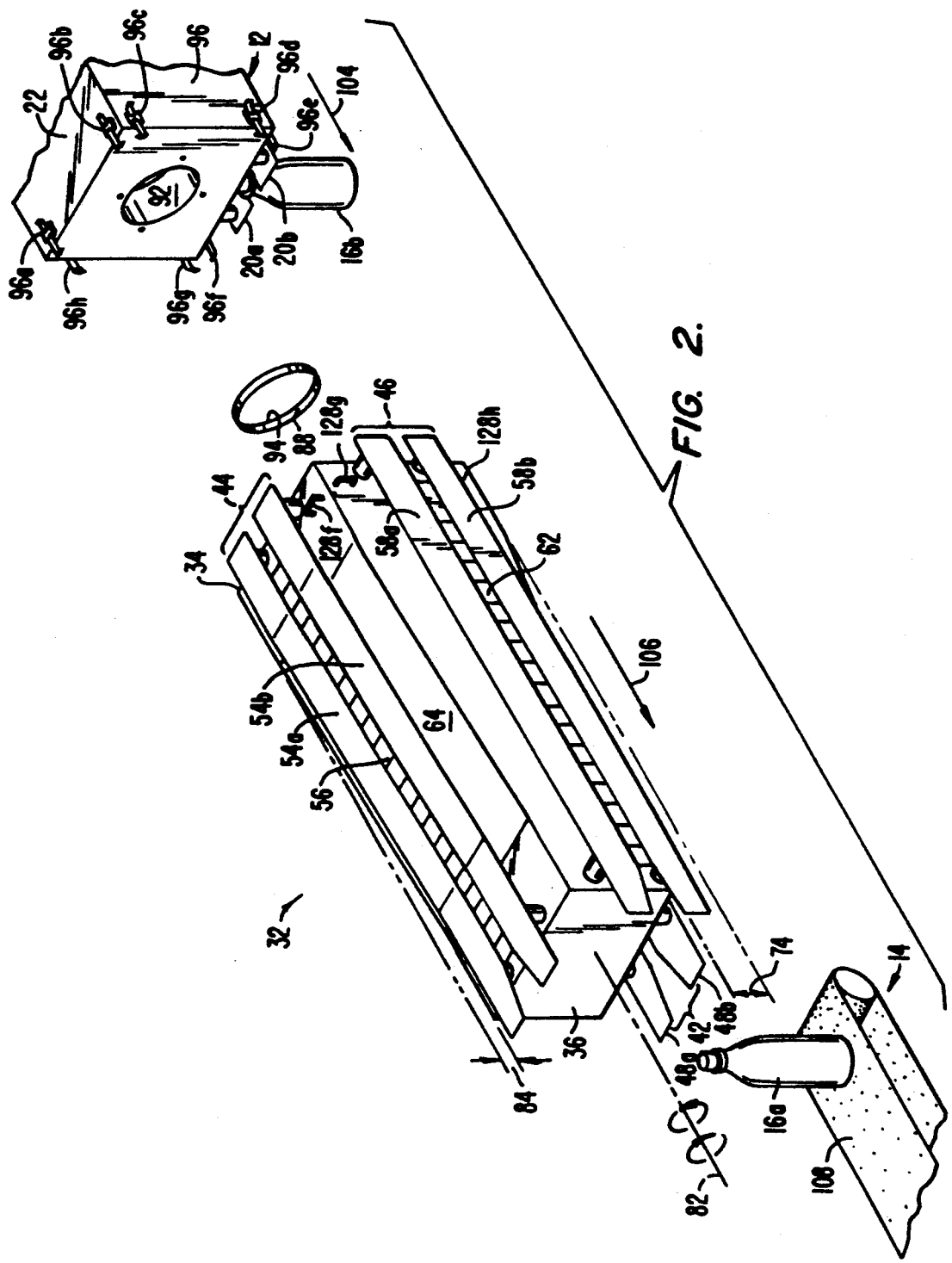
FIG. 2 is an exploded perspective view of a structure according to one embodiment of the present invention with partial views of first and second conveyors.

As depicted in FIG. 2, a rotatable structure 32 having an upstream end 34 and a downstream end 36 includes first, second and third changeover parts 42, 44, 46. The first changeover part 42 includes first and second guide rails 48a, 48b and an apertured wall 52 (FIG. 6). The second changeover part 44 includes first and second guide rails 54a, 54b and an apertured wall 56. The third changeover part 46 includes first and second rails 58a, 58b and an apertured wall 62. The apertured walls 52, 56, 62 are preferably portions of the walls of a plenum 64 to which the guide rails 48a, 48b, 54a, 54b, 58a, 58b are attached by posts 66a, 66b, 66c, 66d, 66e, 66f. The upstream end 34 of the plenum 64 has a circular opening which acts as an air input 68 (FIG. 5).

The plenum 66 can be formed of any material with the necessary structural strength, preferably sheet steel. The guide rails 48, 54, 58 are preferably formed of a material with relatively low sliding friction such as stainless steel and may be coated on the interior edges with a low friction material such as Teflon ® or ultra-high molecular weight polyethylene.

Figures 1A, 1B:
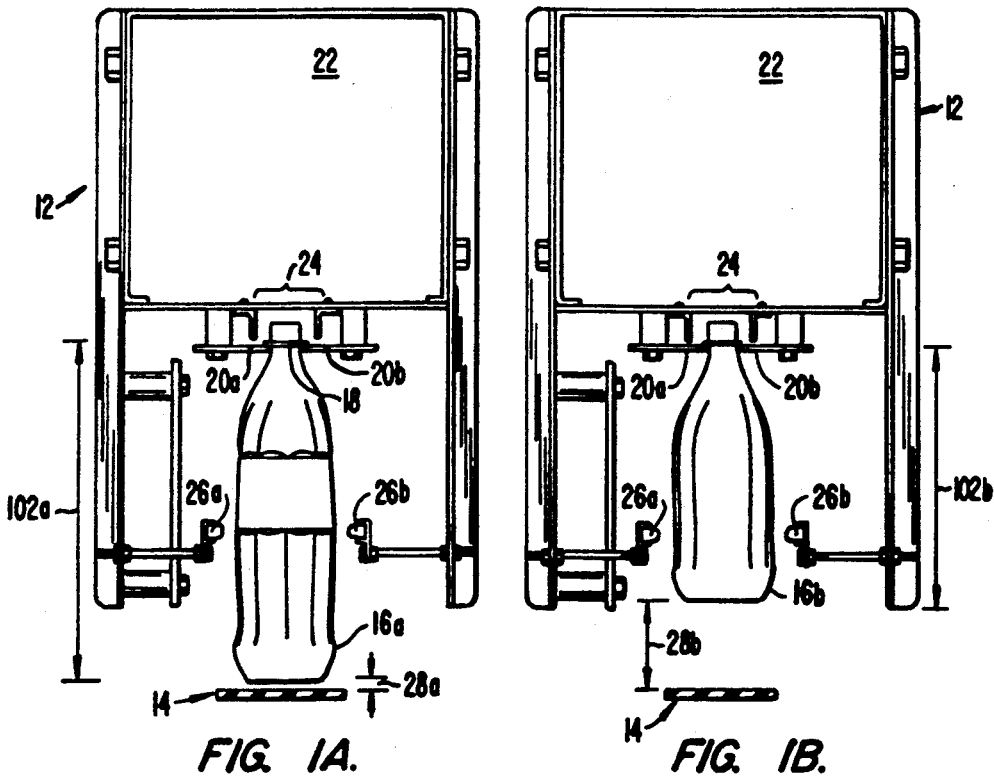
FIG. 1A is a cross-sectional view showing a first conveyor and a second conveyor for conveying a larger object, according to previous devices.
FIG. 1B is a cross-section showing the conveyors of FIG. 1A conveying a smaller object.
Figure 3:
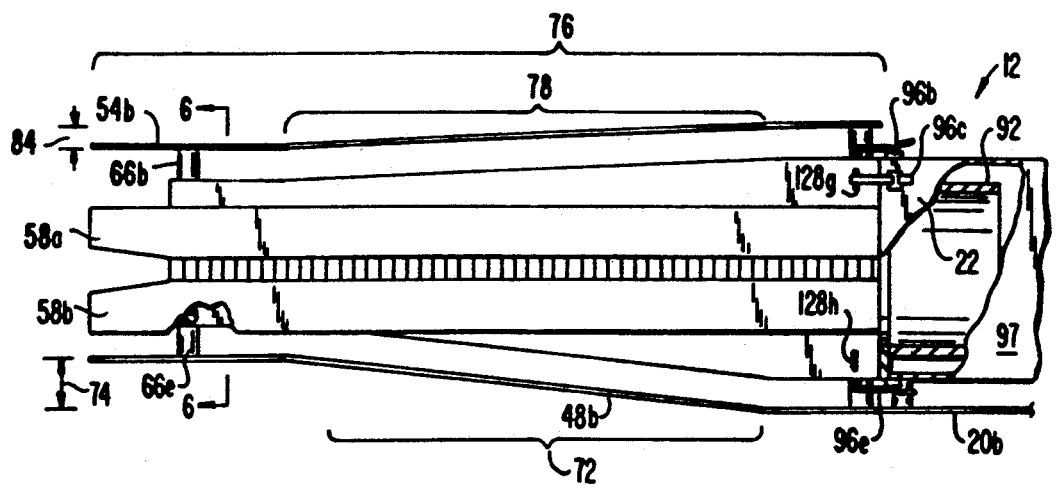
FIG. 3 is a elevational view of a structure according to the present invention, partially broken away, attached to a portion of a first conveyor, partially broken away.

In order to accommodate different sized objects such as a larger ringed-neck bottle 16a and a smaller ringed-neck bottle 16b, changeover parts 42, 44, 46 are shaped differently from one another. As seen in FIG. 3, the guide rails 48a, 48b of the first changeover part 42 include a portion 72 which slopes upwardly when the structure 32 is in the position depicted in FIGS. 2 and 3. Because of this upward sloping, there is a difference 74 between the level at which the rings of the ringed-neck bottles are supported at the downstream end 36 and the upstream end 34 of the structure 32. The guide rails 48a, 48b define a slope equal to the difference in level 74 divided by the length 76 of the rotatable structure 32.

The guide rails 54a, 54b of the second changeover part 44 also include a sloped region 78. When the rotatable structure 32 is rotated about a rotation axis 82 to a second position, as depicted in FIG. 7, there is a difference 84 between the height at which a ringed-neck bottle is supported at the downstream end 36 and the upstream end 34 of the structure 32. The second set of guide rails 54a, 54b define a slope equal to the change in levels 84 divided by the length 76. The difference in levels 74 when the structure 32 is in the first position 7 is different from the difference in levels 84 when the structure is in the second position 8. The walls of the plenum 64 are shaped to be generally parallel with the guide rails as best seen in FIGS. 3 and 7.

In the embodiment depicted in FIG. 2, rotation of the structure 32 with respect to the first conveyor 12 is facilitated by a bearing 88. Although the bearing 88 is shown in FIG. 2 as a separate structure, the bearing 88 can also be formed as an integral part of the first conveyor 12 or the upstream end 34 of the structure 32. In the embodiment depicted in FIG. 2, the bearing 88 is configured to partially fit inside a sleeve 92 formed in a component 97 of the first conveyor 12. The sleeve 92 opens into the interior of the conduit or plenum 22 of the first conveyor 12. In this way, pressurized air from the first conveyor 12 can pass through the sleeve 92, through the opening 94 of the bearing 88 and through the inlet 68 of the rotatable structure 32. In the embodiment depicted in FIG. 9, the bearing 88 extends into and rotatably supports the rotatable structure 32 by fitting into a sleeve 92' which is attached to and extends into the interior of the plenum 64 of the rotatable structure 32. The plenum 64 acts as a conduit for providing pressurized air from the first conveyor 12 to the apertured walls 52, 56, 62 of the rotatable structure 32. The amount of pressure provided to the plenum 66 will depend upon the shape, mass, and desired speed of the objects to be conveyed. Typically, the pressure will be less than one pound per square inch (PSI) (7 kPa) such as, about 0.25 PSI (1.7 kPa).

Preferably, latches 96a, 96b, 96c, 96d, 96e, 96f, 96g, 96h are attached to the first conveyor 12 for engaging with the rotatable structure 32 to hold the rotatable structure 32 in a desired position. Latches 96 may be any kind of releasable latch including Model 351 or 351SS available from DE-STA-CO.

Figure 9:
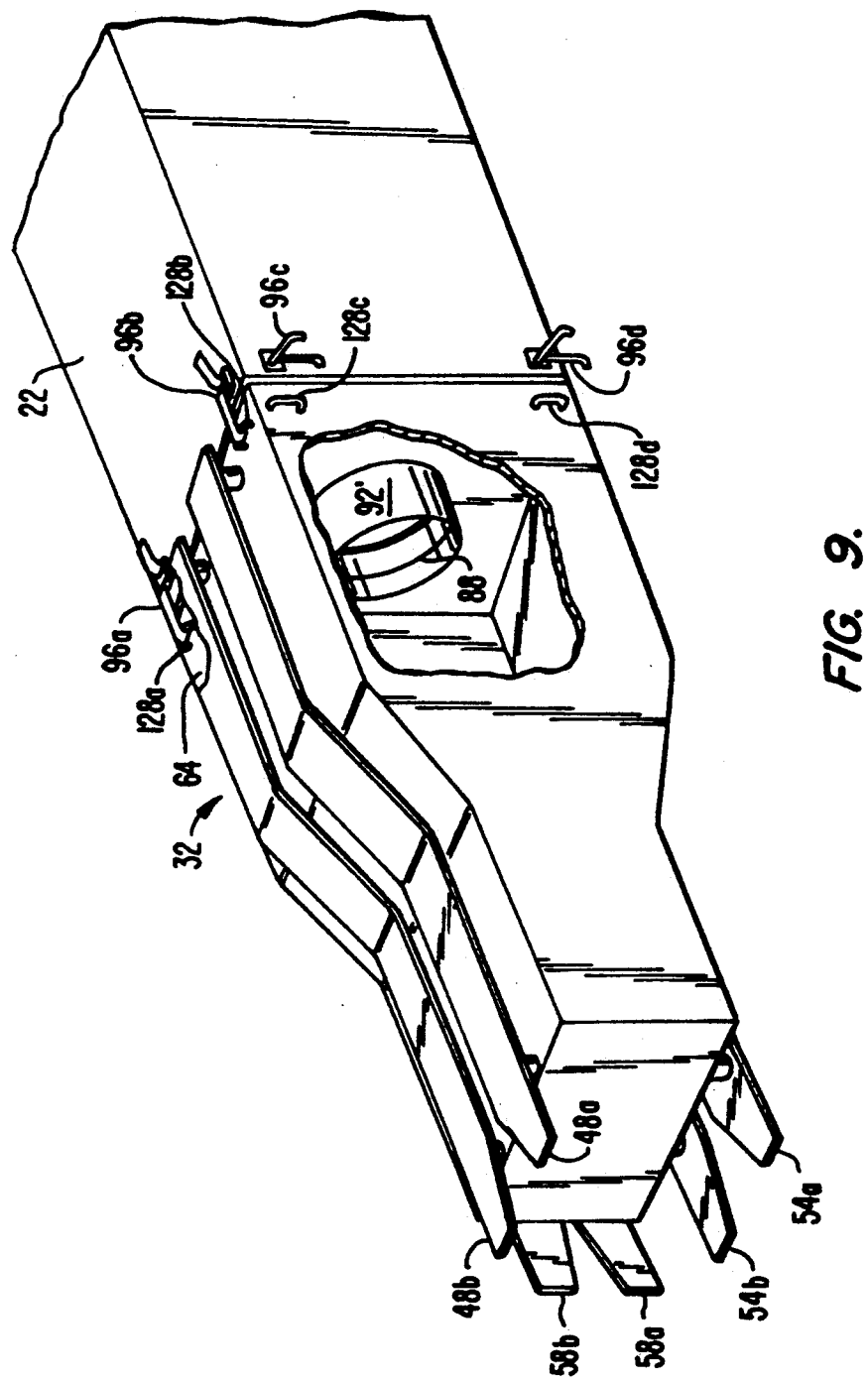
FIG. 9 is a perspective view of apparatus according to another embodiment of the present invention, with portions broken away.

As best seen in FIG. 9, the latches 96 are positioned on the exterior of the first conveyor and engage catches 128a-128h located on the exterior of the rotatable structure 32. In the depicted embodiment, the latches are toggle-type latches movable from an engaging configuration 96a, 96b to an open or disengaged position 96c, 96d.

In operation, the rotatable structure 32 is rotated to a first position, as depicted in FIG. 3 and latched, using latches 96. The first conveyor 12 is used in its normal operating mode, conveying a first object 16a having a first effective height 102a (i.e., distance from the plane of support by the first conveyor to the plane of support by the second conveyor) toward the downstream end of the first conveyor 12 in a first direction 104 As shown on FIG. 3, when the rotatable structure 32 is in the first position, the guide rails 48a, 48b of the first changeover part 42, at their upstream end 34, are aligned with the guide rails 20a, 20b of the first conveyor 12. The first object 16a, therefore, travels smoothly onto the guide rails 48a, 48b of the first changeover part 42 and move in a direction 106 from the upstream end 34 to the downstream end 36 of the rotatable structure 32. Because of the slope 72 of the guide rails 48a, 48b, the objects are moved a vertical distance 74 from a first level to the second level. The second level is selected such that a bottle 16a having the first height 102a will properly engage with the second conveyor system 14. Particularly, the bottom of the bottle 16a, when it is at the second level, will be even with the belt 108 of the second conveyor system 14. This process is continuously performed for a plurality of bottles of the first height 102a.

When it is desired to begin conveying bottles of a second height 102b, the latches 96a, 96b, 96c, 96d are disengaged and the rotatable structure 32 is rotated, using the bearing 88, to the second position, depicted in FIG. 7. When the rotatable structure 32 is in the second position, the guide rails 54a, 54b of the second changeover part 44 are aligned with the guide rails 20a, 20b of the first conveyor 12. Bottles 15b having a second effective height 102b are conveyed in the direction 106 by the action of the pressurized air flowing through the apertured wall 56 and, in this conveying process, the level of the bottles is changed by an amount 84. The amount 84 is selected such that when bottles having the second height 102b reach the downstream end 36 of the rotatable structure 32, the bottoms of the bottles 16b will be even with the belt 108. The rotatable structure 32 can be rotated to permit use of the third changeover part 46 in a similar manner e.g., for use in conveying an object having a third height.

Another embodiment of the present invention is depicted in FIGS. 8A and 8B. In this embodiment, the first conveyor 12' is a belt conveyor and the second conveyor 14' is a pressurized air conveyor. The rotatable structure 32' of the second embodiment is similar to the rotatable structure 32 of the first embodiment, except that the apertures of the apertured walls 52', 56', 62' are shaped to direct the pressurized air so that the direction of conveyance 106 is a direction away from the belt conveyor 12'. The belt conveyor is used to support the bottoms of a plurality of sizes of objects such as ringed-neck bottles, including larger objects 16a and smaller objects 16b, in a first direction 104. The belt 108 is at a predetermined distance 122 from the axis of rotation 82 of the rotatable structure 32'. When the rotatable structure 32' is in a first position, as depicted in FIG. 8A, the upstream end 34 of the first set of guide rails 48a, 48b is a distance 124a from the axis 82, selected to position the upstream end 34 od the guide rails 48a, 48b adjacent the guide rail engagement portion (i.e. the neck ring 18) of the larger-sized objects 16a. When it is desired to convey smaller sized objects 16b from the first conveyor 12' to the second conveyor 14', the latches 96a, 96b, 96c, 96d are disengaged and the rotatable structure is rotated to a second position, as depicted in FIG. 8B, and the latches 96a, 96b, 96c, 96d are re-engaged. When the rotatable structure 32' is in the second position, the upstream end 34 of the second set of guide rails 54a, 54b are a distance 124b from the axis 82 thus positioning the upstream end 34 od the guide rails 54a, 54b adjacent the guide rail engagement portion 18 of the smaller-sized objects 16b.

In light of the above description, a number of advantages of the present invention can be seen. The present invention permits selection from among a number of changeover parts without requiring changeover parts to be removed and installed, thus reducing the amount of time required to configure a conveying system to accommodate the different sizes of conveyed objects. The present invention has a low number of moving parts, thus minimizing wear, particularly wear of guide rails. The present invention is easy to use, requiring a minimum of training, maintenance, and installation effort. Because the pressurized air from the first conveyor system can be used for the rotatable structure, the present invention provides uninterrupted positive air drive along the entire path of conveyance. Although various changeover schemes have been and might be conceived, the system of the present invention provides for changeover while requiring little volume or floor space, requiring little additional mounting or suspension facilities, requiring little modification of existing conveyance systems, and having low costs of design, installation, maintenance and operation.

A number of modifications and variations can also be used. The plenum 66 can be configured so that pressurized air provided from the first conveyor system is conveyed to only the lowermost apertured wall. The pressurized air can flow from the rotatable structure, as a source, into the plenum of an adjacent air conveyor. The rotatable structure can be used in connection with conveying systems other than an upstream air conveyor and downstream belt conveyor depicted. The rotatable structure can be used in connection with conveying objects other than bottles and in conveying objects other than ringed-neck objects, such as boxes, cans, and the like. Although the depicted device includes three changeover parts, more or fewer changeover parts can be provided, which may involve using plenums with curved sides or with more than four sides in cross-section. The rotatable structure can be supported by additional bearings or different bearings, such as a bearing on the downstream end of the structure. The latches can engage the bearing, rather than the exterior of the rotatable structure. The rotatable structure can be used with axes of rotation other than the axis depicted, such as vertical and/or different horizontal axes. The rotatable device can be used for purposes other than connecting a first conveyor to a second conveyor, such as for changing configuration in the interior of a single conveyor system. The rotatable structure can be used for lowering levels of objects as well as raising levels of objects.

Although the present invention has been described by way of a preferred embodiment and various modifications and variations, other modifications and variations of the invention can also be used, the invention being defined by the appended claims.

What is claimed is:

1. In a conveyor system for supporting objects with a plurality of sizes including at least larger sized objects and smaller sized objects, the system having a first conveyor and a second conveyor, the first conveyor having a component for supporting objects at a first level and for conveying said objects along a path toward a first end of the component, said objects moving in a first direction in the vicinity of said first end, said second conveyor for supporting the objects at a second level, apparatus for conveying objects from said first conveyor to said second conveyor, comprising:

a rotatable structure which includes at least first and second changeover parts each changeover part including
a set of guide rails; and
an apertured wall for directing pressurized air toward said objects to convey said objects along a path from an upstream end of said changeover part to a downstream end of said changeover part;

a conduit having an input for receiving a source of pressurized air, said conduit transmitting received pressurized air to said apertured wall of at least one of said first and second changeover parts;

a bearing which rotatably supports said rotatable structure with respect to said first and second conveyors, permitting rotation of said rotatable structure about a first axis between a first position and a second position;

said first changeover part aligned with its upstream end adjacent said first end of said first conveyor component and its downstream end positioned with respect to said second conveyor to position said larger objects at said second level, when said rotatable structure is in said first position; and said second changeover part aligned with its upstream end adjacent said first end of said first conveyor component and its downstream end positioned with respect to said second conveyor to position said smaller objects at said second level, when said rotatable structure is in said second position.

2. Apparatus, as claimed in claim 1, wherein each of said first and second changeover parts defines a slope with respect to said first direction, the slope defined by said first changeover part being different from the slope defined by said second changeover part.

3. Apparatus, as claimed in claim 1, further comprising a latch for releasably holding said rotatable structure in one of at least said first position and said second position.

4. Apparatus, as claimed in claim 1, wherein said axis is substantially parallel to said first direction.

5. Apparatus, as claimed in claim 1, wherein said axis is substantially parallel to a direction from said upstream end to said downstream end.

6. Apparatus, as claimed in claim 1, wherein said objects include ringed-neck bottles and wherein said guide rail are configured to engage the rings of said ringed-neck bottles.

7. Apparatus, as claimed in claim 1, wherein at least one of said first and second conveyors is a pressurized-air conveyor.

8. Apparatus, as claimed in claim 1, wherein said first conveyor is a pressurized air conveyor and said second conveyor is a belt conveyor.

9. Apparatus, as claimed in claim 1, wherein said first conveyor is a belt conveyor and said second conveyor is a pressurized air conveyor.

10. Apparatus, as claimed in claim 1 wherein said rotatable structure includes more than two changeover parts.

11. Apparatus, as claimed in claim 1, wherein said bearing includes an opening to permit introduction of pressurized air into said rotatable structure.

12. Apparatus, as claimed in claim 1, wherein said source of pressurized air is a pressurized region of said component of said first conveyor.

13. Apparatus, as claimed in claim 12, wherein said rotatable structure includes a plenum in fluid communication with said pressurized region.

14. Apparatus, as claimed in claim 13, wherein said plenum forms at least part of said conduit.

15. In a conveyor system for supporting ringed-neck bottles with at least a larger and a smaller height, the system having a first pressurized air conveyor and a second belt conveyor having a belt, the first conveyor having a component for supporting the bottles and for conveying said bottles along a path toward a first end of the component, said bottles moving in a first direction in the vicinity of said first end, said second conveyor for supporting the bottoms of said bottles, the rings of the larger bottles on the second conveyor being at a first height above the belt, the rings of the smaller bottles on said second conveyor being at a second height above the belt, less than said first height, apparatus for conveying bottles from said first conveyor to said second conveyor, comprising:

a rotatable structure which includes a plenum and at least first and second changeover parts attached to said plenum, each changeover part including a set of guide rails configured to engage the rings of said ringed-neck bottles; and an apertured wall for directing pressurized air toward said bottles to convey said bottles along a path from an upstream end of said changeover part to a downstream end of said changeover part said plenum having an input for receiving a source of pressurized air, said plenum transmitting received pressurized air to said apertured wall of at least one of said first and second changeover parts;

a bearing which rotatably supports said rotatable structure with respect to said first and second conveyors, permitting rotation of said rotatable structure about a first axis between a first position and a second position;

said first changeover part aligned with its upstream end adjacent said first end of said first conveyor component and its downstream end positioned with respect to said second conveyor to position said larger bottles with the bottle bottoms being level with the belt of said second conveyor, when said rotatable structure is in said first position; and said second changeover part aligned with its upstream end adjacent said first end of said first conveyor component and its downstream end positioned with respect to said second conveyor to position said smaller bottles with the bottle bottoms being level with the belt of said second conveyor, when said rotatable structure is in said second position.

16. In a conveyor system for supporting objects with a plurality of sizes, including at least larger sized objects and smaller sized objects, the system having a first conveyor and a second conveyor, the first conveyor having a component for supporting objects and for conveying said objects along a path toward a first end of the component, said objects moving in a first direction in the vicinity of said first end, said second conveyor for supporting the objects on a surface, said larger-sized objects, when supported on said surface, being a first effective height above said surface, said smaller-sized objects, when supported on said surface, being a second effective height above said surface, apparatus for conveying objects from said first conveyor to said second conveyor, comprising:

first means for using pressurized air to convey the larger-sized objects from an upstream end adjacent said first conveyor, to a downstream end adjacent said second conveyor, and for simultaneously moving said larger-sized objects vertically to said first effective height with respect to said surface;

second means, fixed in a position with respect to said first means, for using pressurized air to convey the smaller sized objects from an upstream end adjacent said first conveyor to a downstream end adjacent said second conveyor and for simultaneously moving said smaller-sized objects vertically to said second effective height with respect to said surface;

means for providing pressurized air to at least one of said first and second means;

means for rotatably mounting said first means and said second means with respect to said first conveyor and second conveyor to permit simultaneous rotation of said first and second means between a first position and a second position;

said first means having its downstream end aligned to position said larger-sized objects at said first effective height with respect to said second conveyor, when said first and second means are in said first position; and said second means having its downstream end aligned to position said smaller-sized objects at said second effective height with respect to said second conveyor, when said first and second means are in said second position.

17. In a conveyor system for supporting objects with a plurality of sizes including at least larger sized objects and smaller sized objects, the system having a first conveyor and a second conveyor, the first conveyor having a component for supporting objects at a first level and for conveying said objects along a path toward a first end of the component, said objects moving in a first direction in the vicinity of said first end, said second conveyor for supporting the objects at a second level, a method for conveying objects from said first conveyor to said second conveyor, comprising:

providing a rotatable structure which includes at least first and second changeover parts, each changeover part including
a set of guide rails
an apertured wall for directing pressurized air toward said objects to convey said objects along a path from an upstream end of said changeover part to a downstream end of said changeover part;

providing a conduit having an input for receiving a source of pressurized air, said conduit transmitting received pressurized air to said apertured wall of at least one of said first and second changeover parts;

rotatably mounting said rotatable structure with respect to said first and second conveyors, permitting rotation of said rotatable structure about a first axis between a first position and a second position;

rotating said rotatable structure to said first position so that said first changeover part is aligned such that its upstream end is adjacent said first end of said first conveyor component and its downstream end is positioned with respect to said second conveyor to position said larger objects at said second level; and rotating said rotatable structure to said second position so that said second changeover part is aligned such that its upstream end is adjacent said first end of said first conveyor component and its downstream end is positioned with respect to said second conveyor to position said smaller objects at said second level.

18. A method, as claimed in claim 17, further comprising latching said rotatable structure after rotating to said first position.

19. A method, as claimed in claim 17, wherein said step of rotating to said first position includes rotating about an axis substantially parallel to said first direction.

* * * * *